WHELPLEY & STORER.
Apparatus for Removing Dust and Gases from Air.
No. 53,068.                                                                           Patented March 6, 1866.
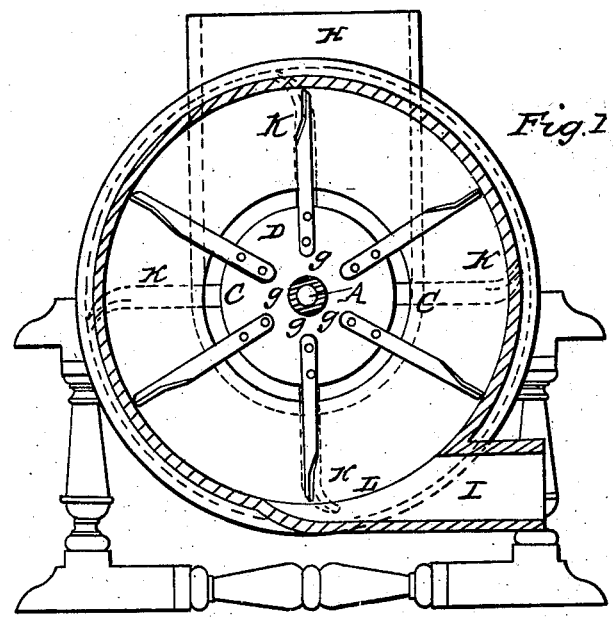
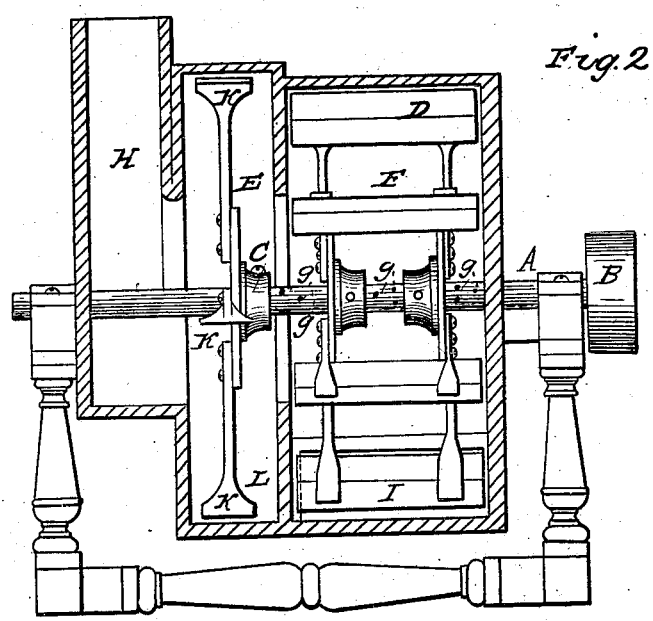

UNITED STATES PATENT OFFICE.

JAMES D. WHELPLEY AND JACOB J. STORER, OF BOSTON, MASSACHUSETTS.

IMPROVED APPARATUS FOR REMOVING DUST AND GASES FROM AIR.

Specification forming part of Letters Patent No. 53,068, dated March 6, 1866.

*To all whom it may concern:*

Be it known that we, JAMES D. WHELPLEY and JACOB J. STORER, both of Boston, in the county of Suffolk and State of Massachusetts, have invented a new and useful Combined Draft and Spray Wheel for Removing Dust and Gases from Air; and we do hereby declare that the following is a full, clear, and exact description of the construction and operation of the same, reference being had to the accompanying drawings, forming a part of this specification, in which—

Figure 1 is a transverse section, and Fig. 2 is a longitudinal section.

Like letters indicate like parts in both figures.

In operating two of the patents granted to us (for a furnace and for a process for reducing metals from ores or cinders) it is necessary to use a fan-blower to create an auxiliary draft, placing it at the end of the apparatus to draw toward it the air from the pulverizer and the air from the chimney of the furnace. With this fan-blower or draft-wheel we also use a spray-chamber or inclosure filled with mist. The air from the pulverizer is filled with finely-divided dust, which we also find in the air from the chimney, together with gases, the products of combustion and of the roasting of the ore. These gases must be taken up by chemicals and the dust collected from the air, in order, first, that no part of the results of our treatment may be wasted; and, second, that the effluvia from the furnace, so noxious to animal health and vegetable development, may be neutralized. To provide a suitable apparatus for this is the object of our present invention, which consists, first, in mounting the fan-blower or draft-wheel on a hollow shaft conveying liquid, and perforated with numerous small holes to distribute spray in the case of the draft-wheel; second, in a separate spray-wheel on the same shaft as the draft-wheel, and in a separate but communicating chamber; third, in so constructing the dashers of the spray-wheel as to throw spray toward the shaft; fourth, in a combination of the hollow shaft perforated only in the case of the fan-blower with the spray-wheel revolving in a separate but connected chamber to increase the quantity and comminution of the spray; fifth, in furnishing two successive supplies or qualities of spray to the gas or dust laden air, whereby the dust and gases are more surely and completely removed; sixth, in using spray holding in solution or suspension certain chemical reagents, for the purpose of cleansing the air of both dust and gases.

Others skilled in the art will find the following description of our invention sufficient to enable them to make and use it.

A is a revolving hollow shaft driven by pulley B, and carrying spray-wheel C and fan-blower or draft-wheel D, revolving in separate but communicating chambers E and F. The hollow shaft is pierced within the chamber F of the draft-wheel by many small holes, $g$, communicating with its hollow.

Air charged with dust or gases, or both, is drawn into the spray-chamber E through trunk H, passed through it and the chamber F of the draft-wheel, and discharged fully cleaned at discharge-pipe I. The condensed spray flowing out through the same pipe I is delivered an impure fluid saturated with the gases and with the dust.

If desired to form new chemical compounds, either with the gases or with the constituents of the gases or dust, the spray can be saturated with chemicals, either heated or cold, dashed by the spray-wheel or distributed by the hollow shaft, so as to gain one or more reactions while passing through the draft-chamber F.

We have used the following chemicals, all of which give satisfactory results: carbonate of lime, quicklime, soluble salts of lime, such as the chloride, caustic soda, commercial soda-ash, carbonate of soda in any form, chloride of sodium, caustic potash, carbonate of potash in any form, chloride of potassium, magnesia and soluble salts of magnesia, alumina and salts of alumina, oxide of copper and salts of copper, soluble oxide of iron, carbonate of iron and salts of iron, hydrochloric, sulphuric, and nitric acids, and acetic acid. The chemicals may be used according to their nature, dissolved in water or other appropriate solvent, or mechanically suspended in the spray, or blown in by steam or air.

The arms of the spray-wheel C are constructed, as shown, with ladle-like dashers $k$, dipping into the liquid used to make spray, the object of which is to throw the spray toward the shaft, so that it may be most profuse at the point where the air passes from trunk H to chamber F, by which means the dust and gases are more thoroughly exposed to spray than they would be if the draft and spray wheels were in the same chamber.

After exposure to spray from the spray-wheel C the air charged with gases and dust passes into chamber F, when the revolving hollow shaft A furnishes still more spray through holes *g*, either of a similar chemical character to the spray from the spray-wheel or different from it, and each particle of dust attracts an atmosphere of moisture, and the noxious gases are taken up by the chemical reagents contained in the spray. There is a special advantage in this arrangement of spray-chambers and draft-wheel—that it allows a double chemical reaction to be effected, as already stated, and by furnishing a second supply of spray the moistened particles are more rapidly and surely precipitated than when there is but one supply, however large. The air also being first charged with dashed spray from the spray-wheel, and then exposed to spurted spray from the hollow shaft, is by far more thoroughly saturated than it would be if all the fluid were supplied to it at once by either device, the spray being so finely divided as to be almost an atmosphere, compelling every particle of air to be accompanied by a particle of the cleansing-fluid.

What we claim as our invention, and desire to secure by Letters Patent, is—

1. The combination of hollow shaft A, having holes *g*, as described, with draft-wheel D, as and for the purpose described.

2. The placing spray-wheel C and draft-wheel D in separate but communicating chambers E and F, as and for the purpose described.

3. The construction of the arms of spray-wheel C with the ladle-like ends *k*, as drawn, so as to throw spray toward the shaft.

4. The combination of hollow shaft A, having holes *g* only in the limits of the chamber F, with spray-wheel C, as and for the purpose described.

5. The furnishing of spray to the dust or gas laden air in successive supplies of the same or different qualities, as and for the purpose described.

6. The use of spray charged with chemical reagents, as described, and for the purposes stated, or mingled with steam or air so charged.

JAMES D. WHELPLEY.
JACOB J. STORER.

Witnesses:
W. H. C. COPELAND,
THOS. WM. CLARKE.